United States Patent
Dögel et al.

(12) United States Patent (10) Patent No.: US 9,834,082 B2
(45) Date of Patent: Dec. 5, 2017

(54) HYBRID DRIVE MODULE AND POWERTRAIN

(71) Applicant: ZF FRIEDRICHSHAFEN AG, Friedrichshafen (DE)

(72) Inventors: Thomas Dögel, Nuedlingen (DE); Michael Kühner, Heilbronn (DE); Andreas Ratte, Dittelbrunn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 254 days.

(21) Appl. No.: 14/439,306

(22) PCT Filed: Sep. 30, 2013

(86) PCT No.: PCT/EP2013/070304
§ 371 (c)(1),
(2) Date: Apr. 29, 2015

(87) PCT Pub. No.: WO2014/067726
PCT Pub. Date: May 8, 2014

(65) Prior Publication Data
US 2015/0298533 A1    Oct. 22, 2015

(30) Foreign Application Priority Data
Oct. 29, 2012    (DE) .................. 10 2012 219 728

(51) Int. Cl.
*F16H 37/06*    (2006.01)
*B60K 6/38*    (2007.10)
(Continued)

(52) U.S. Cl.
CPC ............... *B60K 6/38* (2013.01); *B60K 6/365* (2013.01); *B60K 6/48* (2013.01); *B60K 6/547* (2013.01);
(Continued)

(58) Field of Classification Search
CPC ................................... B60K 6/20; B60K 6/48
(Continued)

(56) References Cited

U.S. PATENT DOCUMENTS

| 5,551,928 A | 9/1996 | Sudau |
| 6,585,066 B1 * | 7/2003 | Koneda ................. B60K 6/365 180/165 |

(Continued)

FOREIGN PATENT DOCUMENTS

| DE | 102009019585 | 11/2009 |
| DE | 102009024530 | 12/2010 |

(Continued)

*Primary Examiner* — Ha D Ho
(74) *Attorney, Agent, or Firm* — Cozen O'Connor (57) ABSTRACT

A hybrid drive module (110) which is constructed to transmit a torque from an input side (120) to an output side (130) includes a torsional vibration damper (180) which is coupled to the input side (120) and which works at least partially on the principle of power splitting, a disconnect clutch (280) which is coupled to the torsional vibration damper (180) and to the output side (130) and which is constructed to interrupt a torque flow from the input side (120) to the output side (130), and an electric drive component (320) which is coupled to the output side (130) and which is arranged so as to introduce a torque component provided by the electric drive component (320) into the torque flow downstream of the disconnect clutch (280).

14 Claims, 5 Drawing Sheets

(51) Int. Cl.
    *B60K 6/48* (2007.10)
    *B60K 6/547* (2007.10)
    *B60K 6/365* (2007.10)
    *F16F 15/121* (2006.01)

(52) U.S. Cl.
    CPC .... *F16F 15/121* (2013.01); *B60K 2006/4825* (2013.01); *B60Y 2300/58* (2013.01); *Y02T 10/6221* (2013.01); *Y02T 10/6252* (2013.01); *Y10S 903/912* (2013.01)

(58) Field of Classification Search
    USPC .............................................. 74/665 B, 661
    See application file for complete search history.

(56) References Cited

U.S. PATENT DOCUMENTS

| | | | | |
|---|---|---|---|---|
| 7,811,190 B2 * | 10/2010 | Tabata | ..................... | B60K 6/26 475/5 |
| 7,828,096 B2 * | 11/2010 | Hoher | ................... | B60K 6/365 180/65.6 |
| 7,988,579 B2 * | 8/2011 | Tabata | ..................... | B60K 6/40 475/5 |
| 8,187,151 B2 * | 5/2012 | Gloge | ................ | F16H 61/0031 477/159 |
| 8,920,275 B2 * | 12/2014 | Reitz | ..................... | B60K 6/383 180/65.25 |
| 2003/0106729 A1 * | 6/2003 | Noreikat | ................. | B60K 6/40 180/65.7 |
| 2012/0055283 A1 * | 3/2012 | Moser | ..................... | B60K 6/40 74/661 |
| 2013/0068580 A1 | 3/2013 | Doegel | | |
| 2013/0072338 A1 | 3/2013 | Dögel | | |

FOREIGN PATENT DOCUMENTS

| | | |
|---|---|---|
| DE | 2011101977 | 12/2011 |
| WO | WO2012/066664 | 5/2012 |

\* cited by examiner

HYBRID DRIVE MODULE AND POWERTRAIN

PRIORITY CLAIM

This is a U.S. national stage of application No. PCT/EP2013/070304, filed on Sep. 30, 2013. Priority is claimed on the following application: Country: Germany, Application No.: 10 2012 219 728.1, Filed: Oct. 29, 2012, the content of which is incorporated herein by reference in its entirety.

FIELD OF THE INVENTION

The present invention relates to a hybrid drive module and a powertrain which can be used, for example, in a motor vehicle with an internal combustion engine for transmitting a torque.

BACKGROUND OF THE INVENTION

In an internal combustion engine, a constant torque can generally not be introduced into a powertrain having this internal combustion engine. Often, this is because periodic ignitions occur in the internal combustion engine and the energy released as a result is converted into a rotational movement of the crankshaft. Accordingly, the torque delivered by the crankshaft and the rotational speed of the crankshaft are both subject to fluctuations and oscillations which are referred to generally as rotational irregularities. Rotational irregularities of this kind may be noticeable in driving mode. Therefore, a general objective is to reduce or eliminate these rotational irregularities as far as possible.

Conventionally, by employing force accumulators or energy accumulators, i.e., for example, springs and correspondingly moving masses, the energies occurring in rotational irregularities of the kind mentioned above are temporarily stored and are then conveyed into the powertrain to achieve a smoother speed curve or torque curve. Likewise in pendulum masses known as speed-adaptive mass dampers, the rotational irregularities occurring in driving condition are converted into oscillating deflections of vibrating masses. The deflection takes place in opposition to centrifugal force and, by predefining the deflection path and the masses to be deflected, it is possible to tune to excitation speeds and excitation frequencies.

Because of the increasingly restricted space availability in modern vehicle construction, there is also less installation space available for the systems used for vibration damping. Therefore, corresponding loss of decoupling quality, i.e., the reduction of occurring rotational irregularities, can occur.

US2013/072338 describes a hybrid drive module with an electric drive component and a torsional vibration damper in the form of a spring-mass accumulator working on the principle of power splitting. The basic idea of power splitting consists in dividing the torque delivered by the internal combustion engine into two power branches, shifting their phasing with respect to one another, and subsequently superposing the two power branches to achieve a reduction in the rotational irregularities in the torque to be transmitted.

Systems of this kind have great technical complexity due to the large quantity of components and the complex interplay between the individual components. Thus there is a multitude of sometimes conflicting objectives in this technical field. It may therefore be advisable to coordinate this complex interplay, also in different operating conditions, to achieve as many advantages as possible with respect to efficiency and/or emissions.

For example, there is a need to find a better compromise between reducing rotational irregularities presenting a powertrain, reducing fuel consumption in a motor vehicle having the powertrain, and improving emissions and weight of the motor vehicle and the installation space available for the powertrain.

SUMMARY OF THE INVENTION

A hybrid drive module, according to an embodiment of the present invention, which is constructed to transmit a torque from an input side to an output side comprises a torsional vibration damper which is coupled to the input side and which operates at least partially on the principle of power splitting. The hybrid drive module further comprises a disconnect clutch which is coupled to the torsional vibration damper and to the output side and which is constructed to interrupt a torque flow from the input side to the output side. The hybrid drive module further comprises an electric drive component which is coupled to the output side and which is arranged so as to introduce a torque component provided by the electric drive component into the torque flow downstream of the disconnect clutch.

Accordingly, a hybrid drive module according to an embodiment of the invention is based on the recognition that, by means of the arrangement described above, a better compromise can be made between reducing rotational irregularities present in a powertrain, reducing fuel consumption in a motor vehicle having the powertrain, and improving emissions and weight of the motor vehicle and the installation space available for the powertrain and that the above-described interplay between the components of the hybrid drive module can be improved. Accordingly, owing to the coupling of the torsional vibration damper to the input side, this torsional vibration damper can be used to damp corresponding rotational irregularities. A more compact and nevertheless high-performing damping of rotational irregularities can also be made possible in the field of hybrids because this torsional vibration damper works at least partially on the principle of power splitting.

Yet, on the other hand, because the disconnect clutch is arranged downstream of the torsional vibration damper but upstream of the electric drive component, the torsional vibration damper can be decoupled along with the input side and the components connected to the input side. Because of this, the mass generated by the torsional vibration damper no longer contributes to the inertia or mass to be accelerated by the electric drive component. Accordingly, it may also be possible to improve driving comfort, reduce noise development and/or reduce fuel consumption or energy consumption. A driving of the output side based on the electric drive component is possible in spite of the decoupled input side.

Further, the hybrid drive module is constructed more compactly. Because of this more compact arrangement of its components, it may also be possible to achieve a reduction in the required installation space and weight.

In a hybrid drive module according to an embodiment of the invention, the torsional vibration damper optionally transmits the torque received from the input side to a superposition gear unit via a first torque transmission path and a second torque transmission path parallel to the first torque transmission path, wherein the torsional vibration damper comprises a phase shifter arrangement in the first torque transmission path for generating a phase shift in a torque irregularity of a first torque component, which torque irregularity is transmitted via the first torque transmission path, with respect to a torque irregularity of a second torque component, which torque irregularity is transmitted via the second torque transmission path. The superposition gear unit can be constructed to superpose the torque components transmitted via the two torque transmission paths. In this way, it is possible to allow a more efficient damping of torsional vibrations also in hybrid drives.

Accordingly, in a hybrid drive module according to an embodiment of the invention, the superposition gear unit optionally is arranged in the torque flow upstream of the disconnect clutch. In this way, it is possible also to decouple the superposition gear unit through the disconnect clutch to allow a further reduction in mass and moments of inertia. In other words, it is possible to simplify a construction of a torsional vibration damper combined with the disconnect clutch so that the rotational irregularities at the crankshaft of the internal combustion engine can be directly compensated or smoothed. Accordingly, the torque delivered to the disconnect clutch can have fewer rotational irregularities. Additionally or alternatively, reduced noise and therefore possibly also increased driving comfort can be achievable in this way because a movement of the superposition gear unit is prevented by the disconnect clutch in the event that driving is provided exclusively through the electric motor component.

In a hybrid drive module according to an embodiment example, the electric drive component optionally has a maximum power output of at least 3 kW. Higher outputs, e.g., 4 kW, 5 kW or 6 kW, can also be provided in order to allow more frequent use of the electric starting component and thus possibly achieve a greater fuel economy or also to support the internal combustion engine for increased efficiency. Depending on the specific implementation, it may possibly be advisable to configure the electric drive component such that it allows a maximum output of more than 6 kW.

Further, a hybrid drive module according to an embodiment of the invention optionally comprise a further torsional vibration damper which is arranged in the torque flow between the disconnect clutch and the output side. By providing the further torsional vibration damper, the vibration damping behavior of the hybrid drive module in the torque transmission path between the input side and output side is further improved.

In a hybrid drive module according to yet another embodiment, the electric drive component optionally comprises a rotor, wherein the hybrid drive module can comprise a stator associated with the rotor, and the rotor and stator can be constructed and arranged in such a way that the rotor and the stator form an electric motor drive. Alternatively, a stator of another component can be associated with the rotor, this stator being constructed and arranged such that the rotor can cooperate with the stator of the other component so as also to form an electric motor drive. Therefore, the stator need not necessarily be constructed as part of the hybrid drive module, but rather can also be arranged at or in another component, for example, at or in the transmission.

A powertrain, according to an embodiment of the invention, which is constructed to transmit a torque from an internal combustion engine to a transmission comprises the internal combustion engine, the transmission, and a torsional vibration damper which is coupled to the internal combustion engine and at least partially works on the principle of power splitting. The powertrain further comprises a disconnect clutch which is coupled to the torsional vibration damper and to the transmission and which is constructed to interrupt a torque flow from the internal combustion engine to the transmission. The powertrain further comprises an electric drive component which is coupled to the transmission and which is arranged so as to transmit a torque component provided by the electric drive component into the torque flow downstream of the disconnect clutch.

As was already mentioned in connection with the hybrid drive module according to another embodiment of the invention, a powertrain according to an embodiment also makes it possible to make a better compromise between reducing rotational irregularities presenting the powertrain, reducing fuel consumption in a motor vehicle having the powertrain, and improving emissions and weight of the motor vehicle and the installation space available for the powertrain by the above-described arrangement and the above-described interplay of components of the powertrain.

By providing the torsional vibration damper which is coupled to the internal combustion engine and which works at least partially on the principle of power splitting, rotational irregularities occurring in the torque generated by the internal combustion engine can be reliably reduced. As a result of the arrangement of the disconnect clutch between the torsional vibration damper and the transmission, an improved decoupling between crankshaft and transmission can be achieved so that driving comfort, for example, acoustic comfort in the vehicle, can possibly also be further improved. Further, a purely electric driving operation can also be made possible without the torsional vibration damper being driven simultaneously because, in the open condition, the disconnect clutch disconnects the internal combustion engine together with the torsional vibration damper from the transmission.

In the powertrain according to an embodiment of the invention, the transmission optionally is an automatic shift transmission. The use of an automatic shift transmission accordingly allows an interruption of the torque flow in the transmission to the components following the transmission in a simple manner. Additionally or alternatively, converter losses are also reduced in this way.

Accordingly, in the powertrain according to an embodiment of the invention, the automatic shift transmission optionally comprises at least one clutch element which is constructed in such a way that a torque flow through the automatic shift transmission can be at least partially or completely interrupted by engaging or disengaging the clutch element. The clutch element can be, for example, a plate clutch, a brake, a band brake or other appropriate machine part. In this way, it is possible to cause the above-described interruption in the torque flow in the transmission using simply constructed devices which may have already been implemented.

The powertrain according to an embodiment of the invention optionally comprises a control device which is constructed to move the disconnect clutch into a closed condition in idling mode of the internal combustion engine so that the torque flow from the internal combustion engine is not interrupted via the disconnect clutch. It is possible in this way to increase a mass which is driven by the internal combustion engine also in idling operation so that a reduction in idling speed and, therefore, in consumption is achieved if required. When an interruption of the torque flow is possible as was described above, the reduction in fuel consumption can also be achieved, for example, when the vehicle is stationary. In other words, consumption economy can be achieved in driving mode by actuating the disconnect clutch in such a way that it is closed already after idling operation of the internal combustion engine. When the disconnect clutch is closed, the electric drive component communicating with the disconnect clutch can be used as flywheel mass for the internal combustion engine.

The powertrain according to a further embodiment of the invention optionally comprises a housing which is filled or fillable with fluid and which receives at least the disconnect clutch. The integration of at least the disconnect clutch in a housing which is filled or fillable with fluid makes it possible to reduce wear, for example, in the region of the disconnect clutch, through the fluid and the lubricating effect brought about by it particularly when the fluid is, or includes, an oil. Improved cooling and/or sound insulation can also possibly be achieved. Influence can also possibly be exerted on the damping behavior because moving components move against the resistance of the fluid, and energy is dissipated in this way. Accordingly, driving comfort can possibly be further improved.

In a powertrain according to the invention, the housing optionally comprises a wet space, wherein the torsional vibration damper and/or superposition gear unit are/is received in the wet space. Other constructional arrangements are also conceivable, for example, providing a dry space in the housing, wherein the torsional vibration damper and/or superposition gear unit are received in the dry space. By arranging these components outside of the wet space, it is possible to reduce the wet space so that a weight reduction of the entire powertrain can be achieved.

Optionally, the powertrain according to an embodiment of the invention comprises a hybrid drive module which includes the torsional vibration damper, the disconnect clutch and the electric drive component. In an arrangement of this type, the input side of the hybrid drive module is coupled to the internal combustion engine and the output side of the hybrid drive module is coupled to the transmission. In this way, it is possible to allow an easier operability of the components of the powertrain.

Optionally, in a powertrain according to an embodiment of the invention, the electric drive component comprises a rotor coupled to the transmission, wherein further the powertrain comprises a stator which is associated with the rotor and which is constructed together with the rotor in such a way that they form an electric motor drive. For example, the stator can be realized as portal the transmission or as an adapter between different components in the powertrain.

Accordingly, the stator need not necessarily be associated directly with the same component as the rotor but rather can be arranged at another part of the powertrain, for example, at the transmission. The stator can also be arranged outside of a housing of the transmission.

The terms frictional engagement connection, positive engagement connection and bonding connection are used in the following description. In this regard, a nonpositive or frictional engagement connection is brought about by static friction, a bonding connection is brought about by molecular or atomic interactions and forces, and a positive engagement connection is brought about by a geometric connection of the relevant mating parts. Accordingly, static friction in particular presupposes a normal force component between the two mating parts. A frictional engagement contact exists when two objects, i.e., for example, the relevant receiving element and the sliding surface, enter into frictional engagement contact with one another such that there is brought about therebetween a force in case of a relative movement perpendicular to a contact surface. In this respect, there may be a difference in rotational speed, i.e., slippage, for example. But in addition to a frictional engagement contact of this type, a frictional engagement contact also includes a frictional engagement or nonpositive connection between the relevant objects in which a corresponding difference in rotational speed or slippage essentially does not occur.

As used herein, one-piece component means a component that is fashioned from exactly one contiguous piece of material. Therefore, the expression "one-piece" can be used synonymously with the expressions "integral" or "of one part".

BRIEF DESCRIPTION OF THE DRAWINGS

The invention will be further described in detail in the following with reference to the accompanying drawings in which.

DETAILED DESCRIPTION OF THE PREFERRED EMBODIMENTS

Identical or comparable components are denoted by identical reference numerals in the following description of the accompanying drawings. Further, collective reference numerals are used for components and objects which occur more than once in an embodiment or diagram but which are described collectively with respect to one or more features. Components or objects which are denoted by identical reference numerals or collective reference numerals may be constructed identically or also differently with respect to one or more or all features, for example, their dimensions, unless otherwise explicit or implicit from the description.

Figure 1:
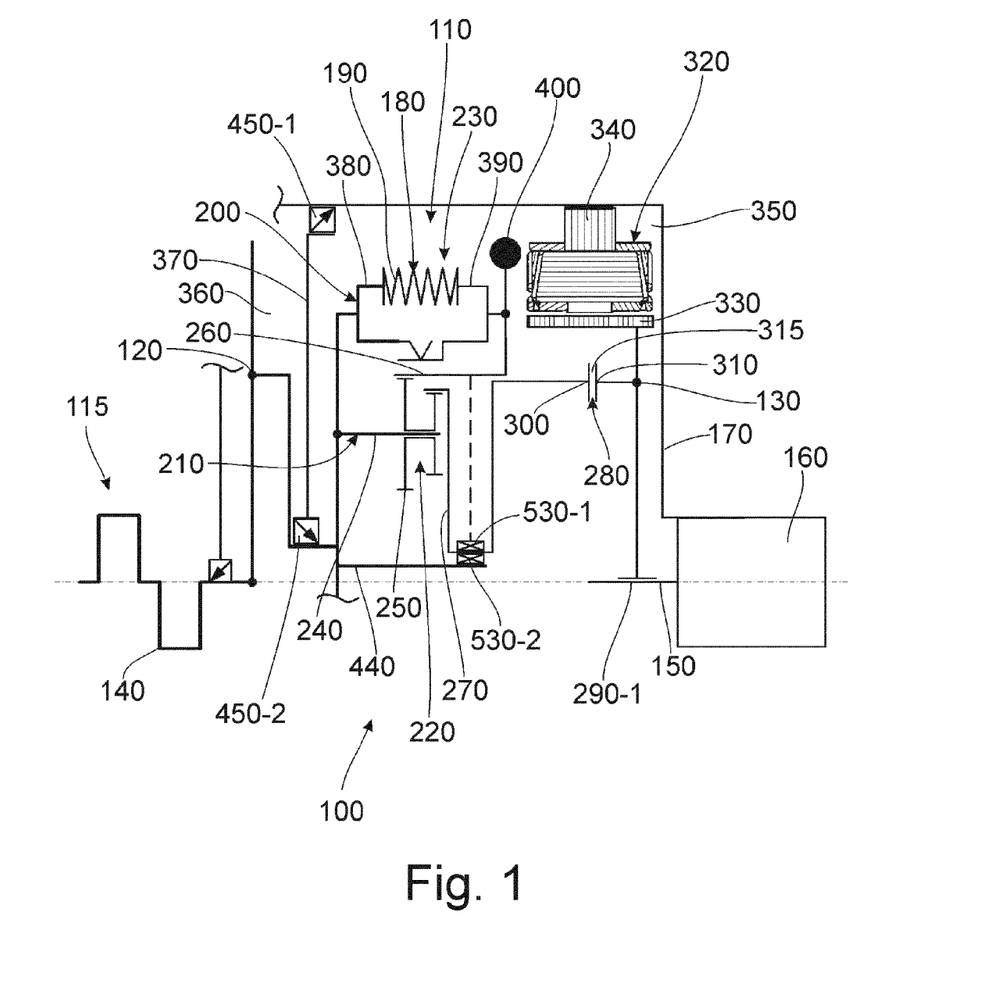
FIG. 1 is a schematic fragmentary longitudinal sectional view through a powertrain according to an embodiment of the invention with a hybrid drive module.

FIG. 1 shows a basic construction of a powertrain 100 with a hybrid drive module 110 according to an embodiment of the invention in longitudinal section. A torque provided by an internal combustion engine 115, shown only schematically in FIG. 1, is transmitted via the hybrid drive module 110 from an input side 120 to an output side 130. The input side 120 is coupled to a crankshaft 140 of the internal combustion engine 115. The output side 130 is coupled to an input shaft 150 of a transmission 160. Accordingly, the output side 130 can be constructed, for example, as an output hub engaging with corresponding teeth of the transmission input shaft 150.

A hybrid drive module 110 comprises a torsional vibration damper 180 which is connected to the input side 120 so as to be fixed with respect to rotation relative to it. Proceeding from the crankshaft 140, the torque is transmitted into the torsional vibration damper 180. In this regard, the torsional vibration damper works at least partially on the principle of power splitting. This means that the torque received from the input side 120 is conveyed to a superposition gear unit 220 via a first torque transmission path 200 and a second torque transmission path 210 parallel to the first torque transmission path 200.

The torsional vibration damper 180 comprises in the first torque transmission path 200 a phase shifter arrangement 230 for generating a phase shift in a torque irregularity of a first torque component, which torque irregularity is transmitted via the first torque transmission path 200, with respect to a torque irregularity of a second torque component, which torque irregularity is transmitted via the second torque transmission path 210. The use of the phase shifter arrangement 230 ensures that by initially splitting and then recombining the transmitted torque an at least partially destructive superposition of oscillation components occurs in the torque to be transmitted as a result of the phase shift introduced. Accordingly, ideally, a virtually complete elimination of rotational irregularities takes place even at least in a particularly critical frequency range. In real implementations, a complete cancelation of this kind can only be realized in rare operating conditions if at all.

In the embodiment shown here, the torque transmitted via the hybrid drive module 110 is split into the two aforementioned torque components. The relative proportion of the two torque components can possibly depend on operating parameters of the powertrain 100 such as, for example, a speed of the input side 120. In particular, the splitting of the torque components can possibly be variable, but possibly also constant.

The torsional vibration damper comprises a primary side 380 (e.g., an input actuation plate) and a secondary side 390 (e.g., an output actuation plate) which is rotatable with respect to the primary side 380 against the action of a spring accumulator 190. In order to further influence the damping behavior of the torsional vibration damper 180, an additional mass 400 can be associated with the secondary side 390 or can be connected to the secondary side 390 so as to be fixed with respect to rotation relative to it for example. The secondary-side mass is accordingly increased so that the resonant frequency can be influenced. The additional mass 400 can also be omitted if, for example, the magnitude of the mass inertia of the output actuation plate 390 of the torsional vibration damper 180 is sufficiently high for the function of phase rotation.

Alternatively, a speed-adaptive mass damper or fixed-frequency mass damper, not shown, can also be provided at the secondary side 390. This can serve to further reduce vibrations arriving at the secondary side 390 upstream of the superposition gear unit 220. Alternatively or concurrently, friction-reducing steps can also be introduced inside the torsional vibration damper 180.

The superposition gear unit 220 is constructed to superpose the torque components guided via the two torque transmission paths 200, 210 in order to eliminate, but at least reduce, the rotational irregularities in the torque to be transmitted. To this end, the superposition gear unit 220 is constructed as a planetary gear set arrangement and includes a planet gear carrier 240 coupled to the second torque transmission path 210. The planet gear carrier 240 is discretionarily non-rotationally connected to the input side 120 and/or to another engine-side component and carries a plurality of planet gears 250 arranged in circumferential direction. The superposition gear unit 220 further comprises an input ring gear 260 and an output ring gear 270. The planet gears 250 are configured as stepped planet gears 250 which engage with the input ring gear 260 and with the output ring gear 270. In the embodiment example shown here, the planet gears 250, the input ring gear 260 and the output ring gear 270 are so configured that the input ring gear 260 has a greater diameter than the output ring gear 270.

A disconnect clutch 280 is arranged downstream of the superposition gear unit 220 in the torque path. The disconnect clutch 280 serves to interrupt the torque flow between the input side 120 coupled to the internal combustion engine 115 and the output side 130 of the hybrid drive module 110 coupled to the transmission 160. Accordingly, the disconnect clutch 280 is arranged downstream of the torsional vibration damper 180 in the torque path from the input side 120 to the output side 130.

Figure 2:
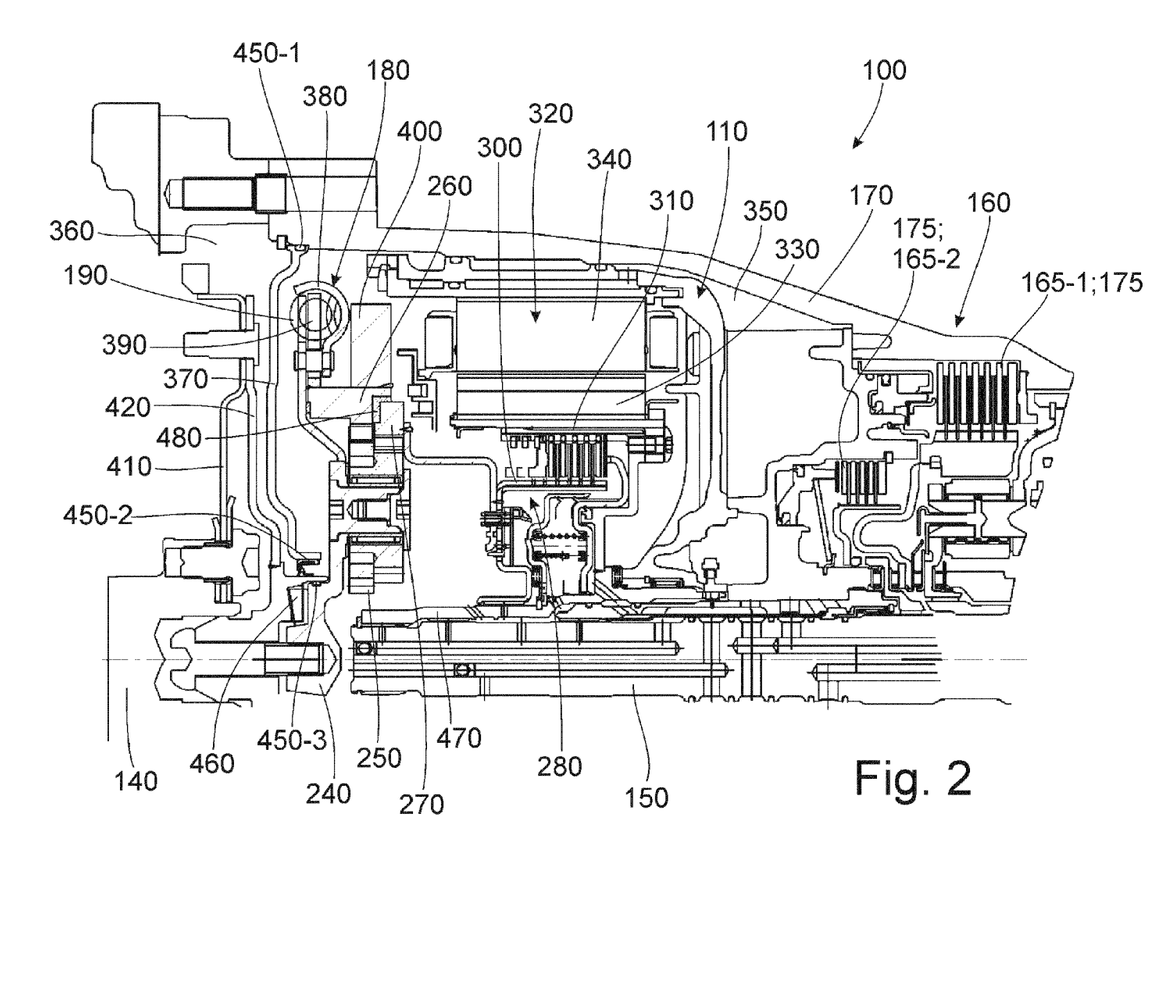
FIG. 2 is a fragmentary longitudinal sectional view through a powertrain corresponding to the principle of construction in FIG. 1.

The disconnect clutch 280 has an input part 300 and an output part 310. The input part 300 which can be constructed, for example, as an inner plate carrier, as will be shown referring to FIG. 2, is discretionarily non-rotationally connected to the output ring gear 270 of the superposition gear unit 220. A rotor 330 of an electric drive component 320 is connected to the output part 310, this rotor 330 comprising one or more parts. In this respect, partial functions of the output part 310, for example, teeth for the plate assembly 315, can be integrated in the rotor 330.

In the embodiment shown here, the electric drive component 320 is realized as an electric motor or electric motor drive with a stator 340 associated with the rotor 330. Accordingly, when the disconnect clutch 280 is open, a purely electric drive mode is enabled in that the vehicle drive is effected only via the electric drive component 320 and the transmission 160. The actual starting clutch/starting brake can be located within the transmission 160 or transmission housing 170. When sufficiently dimensioned, the disconnect clutch 280 can also take over the function of the starting clutch. Alternatively, the disconnect clutch 280 can also be provided between the crankshaft 140 and the torsional vibration damper 180.

In the arrangement shown in FIG. 1, the stator 340 of the electric drive component 320 is discretionarily non-rotationally connected to the transmission housing 170, e.g., by means of screwing and centering. The transmission of torque from the rotor 330 or output part 310 of the disconnect clutch 280 to the transmission input shaft 150 takes place, for example, via a severable connection 290-1, for example, a severable insertion teething. The rotor 330 is supported at the planet gear carrier 240 via the disconnect clutch 280 and the output-side outputting gear 270 connected to the latter and, further, at the transmission input shaft 150 via bearings 530-1, 530-2. A flange portion 440 at the planet gear carrier 240 serves to receive the bearing 530-2 for the outputting gear 270. Alternatively, both bearings can be located on the transmission input shaft 150.

The electric drive component 320 always acts as direct drive in the torque path downstream of the disconnect clutch 280 and is discretionarily arranged upstream or downstream of the torsional vibration damper 180. Accordingly, a torque component provided by the electric drive component 320 is always introduced into the torque path downstream of the disconnect clutch 280. In the embodiment shown in FIG. 1, the electric drive component 320 is arranged inside the housing 170 of the transmission 160. However, other arrangements are also possible. For example, the electric drive component 320 and axis of rotation thereof, respectively, can also be arranged outside of the transmission housing 170, for example, with parallel offset relative to the transmission input shaft 150. In an arrangement of this kind, the feed-in position between disconnect clutch 280 and transmission input shaft 150 can remain the same. Depending on the specific configuration, only one additional transfer member (e.g., a belt or toothing) can be provided between the electric drive component 320 and transmission input shaft 150. The hybrid drive module 110 can also have an independent housing.

In the embodiment shown in FIG. 1, a wet space 350 and a dry space 360 delimited therefrom by a dividing wall 370 are provided inside the transmission housing 170. In the present embodiment, the torsional vibration damper 180 is located in the wet space 350 along with the primary side 380, secondary side 390 and associated spring accumulator 190. The input side 120 of the hybrid drive module 110, which is realized in the present instance as a severable connection or as a connection plate screwed between crankshaft 140 and primary side 380 of torsional vibration damper 180, is located in the dry space 360.

Static and dynamic seals 450 are inserted between the dividing wall 370 and transmission housing 170 for sealing the wet space 350 in the transmission housing 170. Seal 450-1 between the transmission housing 170 and the dividing wall 370 is constructed as a static seal, and seal 450-2 between the dividing wall 370 and input side 120 is constructed as a dynamic seal. The dynamic seal 450-2 between the dividing wall 370 and input side 120 has a prepressing at the sealing edge. In this way, any radial and/or axial movements of the input side 120 relative to the dividing wall 370 can be compensated.

Alternatively, the dividing wall 370 may be omitted when a dry friction clutch is used as disconnect clutch 280. In this case, the torsional vibration damper 180 and/or superposition gear unit 220 are/is arranged inside at least one separate wetspace.

The wetting of the toothed regions of the planet gears 250, input ring gear 260, output ring gear 270 and torsional vibration damper 180 with oil can be carried out by loss lubrication, possibly with the assistance of oil baffles and orifices in the region of the transmission input shaft 150.

In the following, the cooperation between the components of the powertrain 100, particularly the operation of the torsional vibration damper 180, will be described referring to FIG. 2 which shows a possible constructional embodiment of the powertrain 100 from FIG. 1.

The torque generated by the internal combustion engine 115, not shown in FIG. 2, is transmitted from the crankshaft 140 into a drive plate 410 which may be arranged discretionarily so as to be fixed with respect to relative rotation. The drive plate 410 is connected by a flexible connection plate 420 (flex plate) to a radial outside location discretionarily so as to be fixed with respect to relative rotation. The drive plate 410 and flexible connection plate 420 are arranged in the dry space 360. One torque component of the torque is transmitted into the torsional vibration damper 180 from the flexible connection plate 420 via a Hirth coupling 460, and the other torque component of the torque is introduced via the planet gear carrier 240. In this embodiment example, the output part of the Hirth coupling 460 is formed integral with the planet gear carrier 240. Other constructions are also possible, for example, a positive engagement connection and/or frictional engagement connection of the two components.

The entire hybrid drive module 110 is located in the wet space 350. The dividing wall 370 which divides the dry space 360 from the wetspace 350 is arranged axially between the flexible connection plate 420 and the torsional vibration damper 180. Any static seal 450-1 which can be implemented as an O-ring, for example, is provided between the dividing wall 370 and the transmission housing 170. The dividing wall 370 and the seal 450-1 contacting it are held in axial and/or radial position with respect to the transmission housing 170 by means of a positive engagement connection and/or frictional engagement connection, for example, by means of a retaining ring or a groove ring.

Further, a dynamic sealing ring 450-2 is provided in the radial inner region between the dividing wall 370 and the Hirth coupling 460 or the connection of the torsional vibration damper 180 and planet gear carrier 240. Since the Hirth coupling opens toward the wet space 350, a static seal 450-3 is also implemented between the two toothed portions of the Hirth coupling 460. However, other constructions are also possible, for example, in the form of an inverted construction in which this seal can be omitted.

The torsional vibration damper 180 is actuated via the input actuation plate of the primary side 380. Abatement takes place after the spring accumulator 190 inside the torsional vibration damper 180 via the output actuation plate of the secondary side 390 which is connected to the additional mass 400 by welding. However, other frictional engagement connections, positive engagement connections or bonding connections are also possible. The output actuation plate 390 and/or the additional mass 400 can also be formed integral with the input ring gear 260. The spring accumulator 190 can engage the output actuation plate of the second side 390.

The output ring gear 270 is connected to the disconnect clutch 280 likewise by means of a frictional engagement connection, positive engagement connection and/or bonding connection. The outputting gear 270 can be connected to the inner plate carrier 300 or to the outer plate carrier 310 of the disconnect clutch 280, but always in such a way that the electric drive component 320 is supported downstream of the torsional vibration damper 180 in the torque path. This ensures that a torque component provided by the electric drive component is fed into the torque flow downstream of the torsional vibration damper 180.

The rotor 330 of the electric drive component 320 is secured to the outer plate carrier 310 of the disconnect clutch 280, for example, by screwing, on the one hand and is non-rotationally connected to the transmission input shaft 150 via an output flange 470 on the other hand. The output flange 470 is arranged at the transmission input shaft 150 via a position assurance device, e.g., a retaining ring or groove ring, in axial direction and via an insertion toothing in radial direction. The inner plate carrier 300 and the output ring gear 270 connected to the inner plate carrier 300 are radially supported at the output flange 470. The input ring gear 260, output actuation plate 390 and additional mass 400 which communicate with the input ring gear 260 are axially supported at the input actuation plate 380 of the torsional vibration damper 180. The input ring gear 260, additional mass 400 and output actuation plate 390 are axially and radially supported relative to the output ring gear 270, for example, using a sliding bearing 480.

Further, two plate clutch elements 165-1, 165-2 are shown in FIG. 2 in the region of the automatic shift transmission 160 which, for example, as clutch elements 175, can serve to at least partially or completely interrupt the torque flow through the automatic shift transmission 160.

Figure 3:
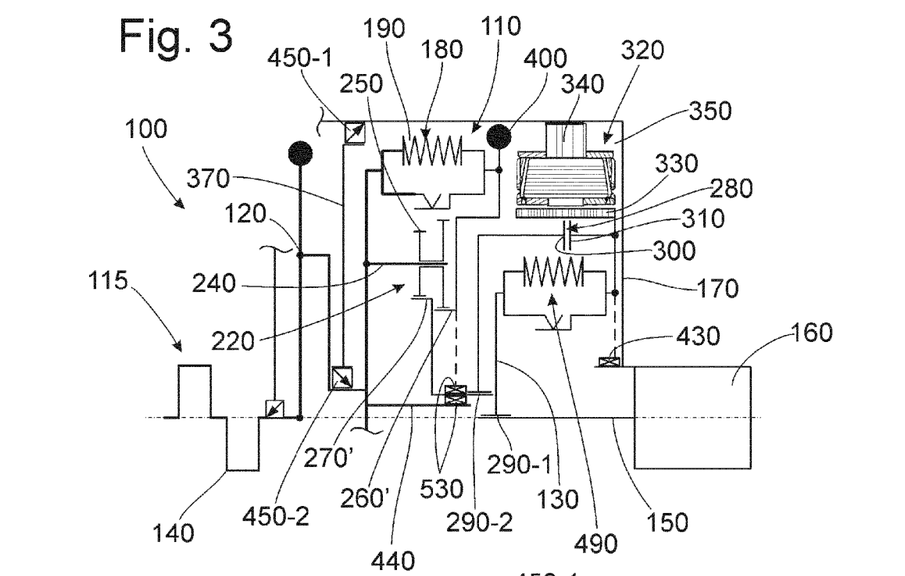
FIG. 3 is a schematic fragmentary longitudinal sectional view through a powertrain with a hybrid drive module according to an embodiment of the present invention.

FIG. 3 shows a basic construction of a powertrain 100 with a hybrid drive module 110 according to a further embodiment of the invention. The variant shown in the present case differs from that of the first embodiment in that sun gears 260', 270' are inserted in the superposition gear unit 220 instead of ring gears 260, 270.

Further, the disconnect clutch 280 is non-rotationally connected to the output sun gear 270' by means of a severable connection 290-2 which is realized, for example, as an insertion toothing.

In addition to the torsional vibration damper 180, the hybrid drive module 110 according to an embodiment comprises a further torsional vibration damper 490. The further torsional vibration damper 490 is arranged between rotor 330 and transmission input shaft 150 and serves to further improve the vibration damping behavior of the hybrid drive module in the torque transmission path between input side 120 and output side 130. The further torsional vibration damper 490 can be realized as a turbine torsional vibration damper, for example.

In the embodiment shown in FIG. 3, the rotor 330 is not supported at the transmission input shaft 150, as is the case in the embodiment from FIG. 1, but rather is supported at the transmission housing 170 by means of a bearing 430 which can be implemented, for example, as a rolling element bearing and/or sliding bearing. The radial bearing support of the sun gears 260', 270' takes place at a flange portion 440 of the planet gear carrier 240.

Figure 4:
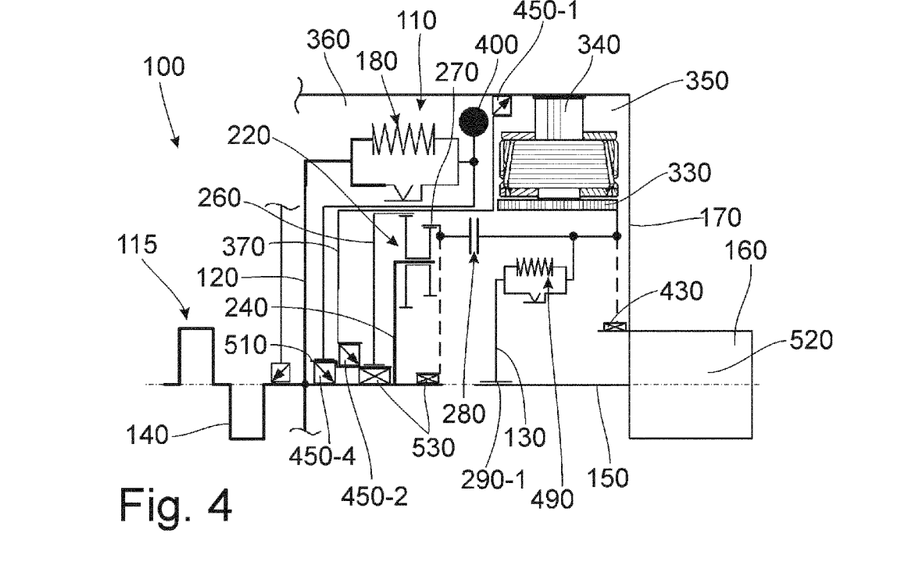
FIG. 4 is a schematic fragmentary longitudinal sectional view through a further powertrain with a hybrid drive module according to an embodiment of the present invention.

The embodiment shown in FIG. 4 differs from the embodiments shown in from FIGS. 1 and 3 in that not all of the components of the hybrid drive module 110 are arranged in the wetspace 350. While the electric drive component 320, superposition gear unit 220, disconnect clutch 280 and additional torsional vibration damper 490 are still arranged in the wetspace 350, the torsional vibration damper 180 along with the additional mass 400 are located in the dry space 360 of the transmission housing 170 and are discretionarily non-rotationally connected to the input ring gear 260, for example, by means of an insertion to comprising one or more parts.

Owing to the arrangement of the torsional vibration damper 180 in the dry space 360 of the transmission housing 170, an additional dynamic seal 450-4 is provided which is arranged between the planet gear carrier 240 and an intermediate segment 510. The sealing of the wet space 350 is accordingly carried out at three places, namely, by seal 450-1 between the dividing wall 370 and transmission housing 170, by seal 450-2 between the dividing wall 370 and intermediate segment 510 and by seal 450-4.

To ensure only a slight wetting of the surfaces of seals 450-1, 450-2, 450-4 facing the wet space 350 and, therefore, a reliable functioning of the seals, the wet space 350 has openings to the transmission sump 520 on a larger radius relative to the transmission input shaft 150 than the contact radius of the sealing edges of the dynamic seals 450. The fluid escaping from the disconnect clutch 280 is guided off permanently into the transmission sump 520 through these openings.

Figure 5:
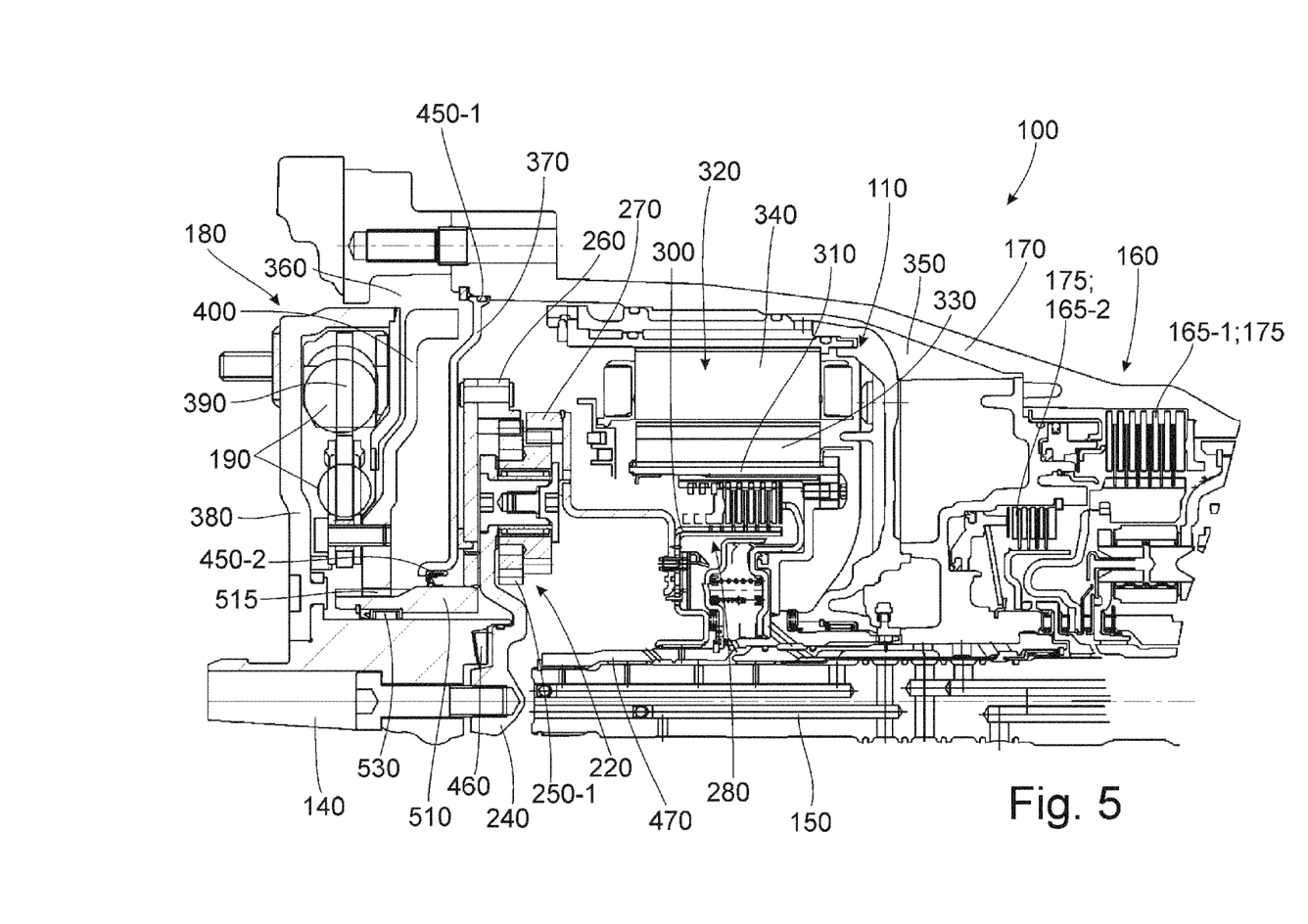
FIG. 5 is a fragmentary longitudinal sectional view through a powertrain according to an embodiment of the present invention.

To ensure a constant sealing gap at seals 450-2 and 450-4, a radial bearing 530 is provided between the planet gear carrier 240 and the intermediate segment 510. This radial bearing 530 can also guide the input ring gear 260, for example. The bearing is shown in FIG. 5 as a rolling element bearing, but it can also be constructed as a sliding bearing. In this regard, the collective arrangement and axial position assurance with the corresponding seal 450-4 should be kept in mind.

The planet gear carrier 240 can be connected to the crankshaft 140 via a discretionarily severable connection.

FIG. 5 shows a fragmentary longitudinal sectional view through a powertrain according to a further embodiment of the present invention. In contrast to the arrangement from FIG. 4, the powertrain comprises only one torsional vibration damper 180. The torsional vibration damper 180, which is arranged in the dry space 360, is formed of two parts in this instance and includes a two-row spring accumulator 190.

The output actuation plates 390 of the two-row spring accumulator 190 are connected to the additional mass 400 by means of any joint connection, for example, by screwing. The additional mass 400 is connected to the input ring gear 260 of the superposition gear unit 220 via intermediate segment 510. The connection 515 between the additional mass 400 and the intermediate segment 510 is constructed, for example, as an insertion toothing. The intermediate segment 510 and the input ring gear 260 which is formed of multiple parts are also connected to one another discretionarily, for example, by means of a weld. However, other type of connection are possible. The planet gear carrier 240 is discretionarily non-rotationally connected, in the present case by the Hirth coupling 460, to the crankshaft 140 and/or the input actuation plate 380.

The intermediate segment 510 and the input ring gear 260 are axially guided relative to the dividing wall 370 via a bearing 530, for example, a sliding bearing or a rolling element bearing. The axial equilibrium between the planet gear carrier 240 and the input ring gear 260 and torsional vibration damper 180 is carried out in the insertion toothing 515 and between the input ring gear 260 and planet gear 250-1. Alternatively, the bearing 530 could be arranged toward the primary side 380 and secondary side 390 of the torsional vibration damper 180 rather than toward the vertical dividing wall 370 as depicted.

The disconnect clutch 280 is guided with the output ring gear 270 axially at the planet gear carrier 240 on the one hand. On the other hand, the disconnect clutch 280 is guided radially at the output flange 470 at the crankshaft 140. Alternatively, the axial bearing support can also be carried out at the output range 470. Further, the output ring gear 270 could be supported axially and radially at the planet gear carrier 240 or input ring gear 260 and would then be connectible to the disconnect clutch 280 by means of a severable joint connection.

Figure 6:
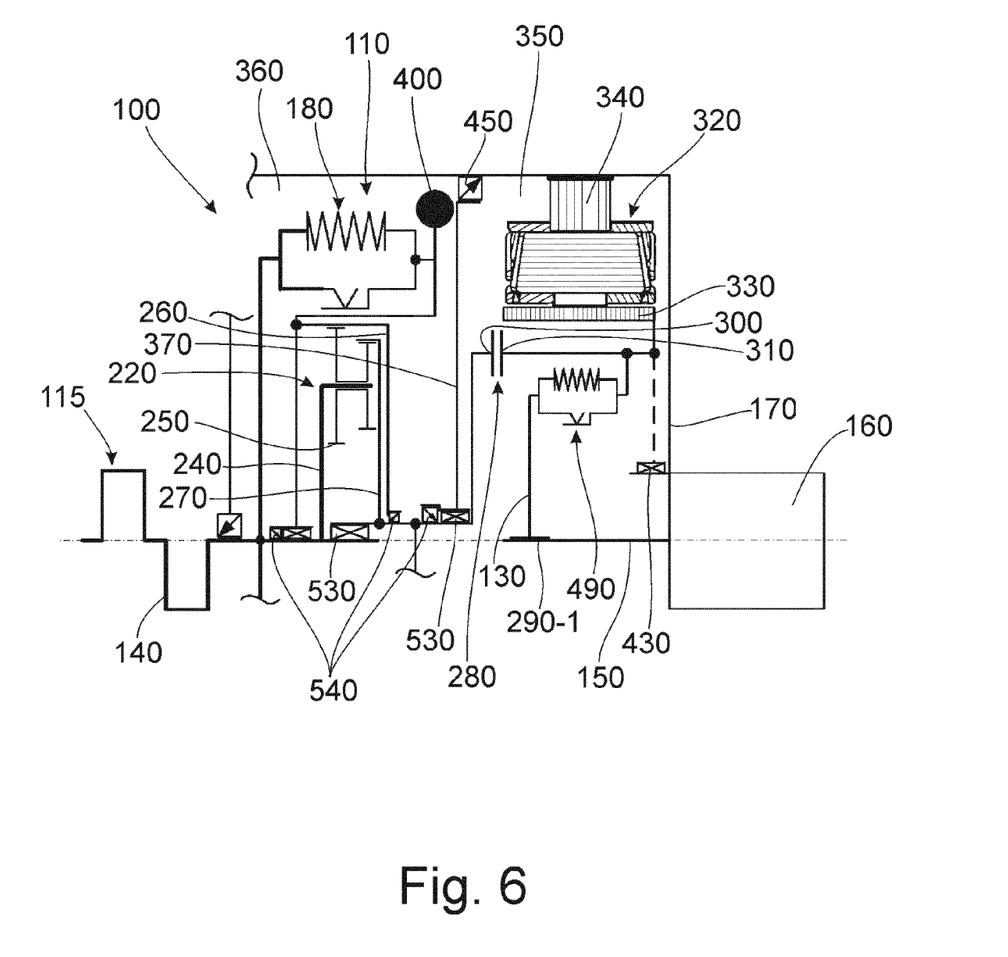
FIG. 6 is a fragmentary longitudinal sectional view through a construction of a powertrain with a hybrid drive module according to yet another embodiment of the present invention as alternative to the construction in FIG. 4.

FIG. 6 shows an alternative embodiment of the constructional principle of a powertrain 100 with hybrid drive module 110 shown in FIG. 4, wherein the arrangement of the components of the hybrid drive module 110 in the wet space 350 and in the dry space 360 differs from the arrangement in FIG. 4.

In addition to the torsional vibration damper 180, the superposition gear unit 220 is also arranged inside the dry space 360 of the transmission housing 170 between internal combustion engine 115 and dividing wall 370.

The torsional vibration damper 180 can be realized as a dual mass flywheel (DMF). A sliding-shell torsional vibration damper and/or a hub-cover plate torsional vibration damper with clutch disk can also be used.

The superposition gear unit 220 is sealed relative to the dry space 360 by a multiple-part sealing system 540 which includes both static and dynamic seals.

The embodiments described referring to the figures relate to a vehicle with a longitudinally mounted powertrain 100 and rear wheel drive. Accordingly, the powertrains 100 according to an embodiment which are shown in these figures have a somewhat longer axial build. However, other mounting concepts, for example, a transversely mounted powertrain 100 with front wheel drive, are also possible. In the latter case, a powertrain 100 of this kind according to an embodiment can possibly have a parallel offset with respect to the transmission input shaft 150 of the transmission 160 to the output side 130 of the hybrid drive module 110 or electronic drive component 320.

The disconnect clutch 280 in the embodiments described in the present instance serves primarily to interrupt the torque flow from the internal combustion engine 115 to the transmission 160. The starting clutch can be located inside the transmission 160 or transmission housing 170. Given sufficient dimensioning of the disconnect clutch 280, it can also be used as a starting element. Embodiments in which the starting function is taken over by the disconnect clutch and transmission simultaneously are also possible.

By employing a hybrid module 110 and/or a powertrain 100 according to an embodiment, a better compromise can be made between reducing rotational irregularities present in the powertrain 100, reducing fuel consumption in a motor vehicle having the powertrain 100, and improving emissions and weight of the motor vehicle and the installation space available for the powertrain 100.

Accordingly, by providing the torsional vibration damper 180 which is coupled to the input side 120 and which works at least partially on the principle of power splitting, the rotational irregularities present in the torque transmitted into the input side 120 can possibly be reduced through a compact arrangement. Further, a rotational movement independent from the torque introduced into the input side 120 can be transmitted to the output side 130 through the electric drive component 320. In this case, owing to the arrangement described above, not only the input side 120 but also the torsional vibration damper 180 can be decoupled through the disconnect clutch 280. As a result, moments of inertia, masses and/or drag moments, and, therefore, possibly also energy consumption, can be reduced and/or driving comfort during operation of the electric drive component 320 can be enhanced. Additionally or alternatively, an improved decoupling between crankshaft 140 and transmission 160 can also be achieved through the arrangement of the disconnect clutch 280 between the torsional vibration damper 180 and the output side 130 so that driving comfort, for example, acoustic comfort in the vehicle, can also be further improved.

The features disclosed in the preceding description, appended claims and accompanying drawings can be significant individually as well as in any combination for implementing an embodiment example in its various refinements.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A hybrid drive module (110) for transmitting a torque from an input side (120) to an output side (130), comprising:
   a torsional vibration damper (180) coupled to the input side (120) and constructed to operate at least partially on the principle of power splitting;
   a disconnect clutch (280) coupled to the torsional vibration damper (180) and to the output side (130) and constructed to interrupt a torque flow from the input side (120) to the output side (130); and
   an electric drive component (320) coupled to the output side (130) and arranged so as to introduce a torque component provided by the electric drive component (320) into the torque flow downstream of the disconnect clutch (280);
   a superposition gear unit (220);
   wherein the torsional vibration damper (180) transmits the torque received from the input side (120) to the superposition gear unit (220) via a first torque transmission path (200) and a second torque transmission path (210) parallel to the first torque transmission path (200);
   wherein the torsional vibration damper (180) comprises a phase shifter arrangement (230) in the first torque transmission path (200) for generating a phase shift in a first torque irregularity of a first torque component, the first torque irregularity being transmitted via the first torque transmission path (200), with respect to a second torque irregularity of a second torque component, the second torque irregularity being transmitted via the second torque transmission path (210), and wherein the superposition pear unit (220) is constructed to superpose the torque components transmitted via the first and second torque transmission paths.

2. The hybrid drive module (110) according to claim 1, wherein the superposition gear unit (220) is arranged in the torque flow upstream of the disconnect clutch (280).

3. The hybrid drive module (110) according to claim 1, wherein the electric drive component (320) has a maximum power output of at least 3 kW.

4. The hybrid drive module (110) according to claim 1, additionally comprising a further torsional vibration damper (490) which is arranged in the torque flow between the disconnect clutch (280) and the output side (130).

5. The hybrid drive module (110) according to claim 1, wherein the electric drive component (320) includes a rotor (330), and wherein the hybrid drive module (110) includes a stator (340) associated with the rotor (330), wherein the rotor (330) and stator (340) are arranged such that the rotor (330) and the stator (340) form an electric motor drive, or wherein a stator (340) of another component is associated with the rotor (330), the rotor (330) being constructed and arranged such that the rotor (330) is able to cooperate with the stator (340) of the other component to form an electric motor drive.

6. A powertrain (100) comprising:
   an internal combustion engine (115);
   a transmission (160); and a hybrid drive module (110) for transmitting a torque from an input side to an output side;
   a torsional vibration damper (180) coupled to the internal combustion engine (115) and constructed to operate at least partially on the principle of power splitting;
   a disconnect clutch (280) coupled to the torsional vibration damper (180) and to the transmission (160) and constructed to interrupt a torque flow from the internal combustion engine (115) to the transmission (160);
   an electric drive component (320) coupled to the transmission (160) and arranged so as to transmit a torque component provided by the electric drive component (320) into the torque flow downstream of the disconnect clutch (280);
a superposition gear unit (220);
wherein the torsional vibration damper (180) transmits the torque received from the input side (120) to the superposition gear unit (220) via a first torque transmission path (200) and a second torque transmission path (210) parallel to the first torque transmission path (200);
wherein the torsional vibration damper (180) comprises a phase shifter arrangement (230) in the first torque transmission path (200) for generating a phase shift in a first torque irregularity of a first torque component, the first torque irregularity being transmitted via the first torque transmission path (200), with respect to a second torque irregularity of a second torque component, the second torque irregularity being transmitted via the second torque transmission path (210), and wherein the superposition gear unit (220) is constructed to superpose the torque components transmitted via the first and second torque transmission paths.

7. The powertrain (100) according to claim 6, wherein the transmission (160) is an automatic shift transmission.

8. The powertrain (100) according to claim 7, wherein the automatic shift transmission comprises at least one clutch element (175) constructed in such a way that a torque flow through the automatic shift transmission can be at least partially interrupted by engaging or disengaging the clutch element (175).

9. The powertrain (100) according to claim 6, additionally comprising a control device constructed to move the disconnect clutch (280) into a closed condition in idling mode of the internal combustion engine (115) so that the torque flow from the internal combustion engine (115) is not interrupted via the disconnect clutch (280).

10. The powertrain (100) according to claim 6, further comprising a housing (170) filled or fillable with fluid and which receives at least the disconnect clutch (280).

11. The powertrain (100) according to claim 6, wherein the housing (170) comprises a wet space (350); wherein one of the torsional vibration damper (180) and the superposition gear unit (220) is received in the wet space (350).

12. The powertrain (100) according to claim 6, wherein the housing (170) comprises a dry space (360), wherein one of the torsional vibration damper (180) and the superposition gear unit (220) is received in the dry space (360).

13. The powertrain (100) according to claim 6, wherein the powertrain (100) includes a hybrid drive module (110) which includes the torsional vibration damper (180), the disconnect clutch (280) and the electric drive component (320).

14. The powertrain (100) according to claim 6, wherein the electric drive component (320) has a rotor (330) coupled to the transmission (160), and a stator (340) associated with the rotor (330) and constructed together with the rotor (330) so as to form an electric motor drive.

* * * * *